(12) United States Patent
Zhou

(10) Patent No.: US 9,652,115 B2
(45) Date of Patent: May 16, 2017

(54) VERTICAL FLOOR EXPANSION ON AN INTERACTIVE DIGITAL MAP

(71) Applicant: GOOGLE INC., Mountain View, CA (US)

(72) Inventor: Bailiang Zhou, Seattle, WA (US)

(73) Assignee: GOOGLE INC., Mountain View, CA (US)

( * ) Notice: Subject to any disclaimer, the term of this patent is extended or adjusted under 35 U.S.C. 154(b) by 375 days.

(21) Appl. No.: 13/777,339

(22) Filed: Feb. 26, 2013

(65) Prior Publication Data

US 2014/0245232 A1 Aug. 28, 2014

(51) Int. Cl.
| | | |
|---|---|---|
| G06F 3/0481 | (2013.01) | |
| G06F 3/0488 | (2013.01) | |
| G06T 17/05 | (2011.01) | |
| G06T 19/00 | (2011.01) | |
| G06T 19/20 | (2011.01) | |

(52) U.S. Cl.
CPC ........ G06F 3/04815 (2013.01); G06F 3/0488 (2013.01); G06T 17/05 (2013.01); G06T 19/003 (2013.01); *G06F 2203/04808* (2013.01); *G06T 19/20* (2013.01)

(58) Field of Classification Search
CPC ............... G06F 3/04815; G06F 3/0488; G06F 17/5004; G06F 3/04842; G06T 17/05; G06T 19/00
See application file for complete search history.

(56) References Cited

U.S. PATENT DOCUMENTS

| | | | |
|---|---|---|---|
| 5,974,876 A * | 11/1999 | Hijikata et al. | 73/178 R |
| 6,201,544 B1 * | 3/2001 | Ezaki | 345/419 |
| 6,912,462 B2 | 6/2005 | Ogaki | |
| 7,075,512 B1 | 7/2006 | Fabre et al. | |
| 7,126,579 B2 * | 10/2006 | Ritter | 345/156 |
| 7,469,381 B2 | 12/2008 | Ording | |
| 7,567,844 B2 | 7/2009 | Thomas et al. | |
| 7,760,187 B2 | 7/2010 | Kennedy | |
| 7,786,975 B2 | 8/2010 | Ording et al. | |
| 7,954,070 B2 | 5/2011 | Plocher et al. | |

(Continued)

OTHER PUBLICATIONS

Niederauer, C, Houston, M, Agrawala, M, and Humphreys, G. Non-Invasive Interactive Visualization of Dynamic Architectural Environments. [online], Apr. 2003 [retrieved on Nov. 17, 2015]. Retrieved from the Internet< URL: https://web.archive.org/web/20030402184818/http://graphics.stanford.edu/papers/archsplit/ >.*

(Continued)

*Primary Examiner* — Tuyetlien T Tran
*Assistant Examiner* — David S Posigian
(74) *Attorney, Agent, or Firm* — Marshall, Gerstein & Borun LLP

(57) ABSTRACT

A digital map of a geographic area is displayed via a user interface, and a 3D representation of a multi-story building located in the geographic area is displayed on the digital map. The 3D representation includes multiple stacked floor maps corresponding to the floors of the multi-story building. In response to the detection of a pinch gesture that is applied to the 3D representation, a vertical distance between each floor map is expanded relative to the detected pinch gesture to reveal features of an internal map that corresponds to each floor map.

19 Claims, 7 Drawing Sheets

(56) References Cited

U.S. PATENT DOCUMENTS

| | | | |
|---|---|---|---|
| 7,956,847 B2 | 6/2011 | Christie | |
| 7,958,456 B2 | 6/2011 | Ording et al. | |
| 8,176,435 B1* | 5/2012 | Jitkoff et al. | 715/788 |
| 8,233,008 B2 | 7/2012 | Jin et al. | |
| 8,464,181 B1* | 6/2013 | Bailiang et al. | 715/848 |
| 8,581,698 B2 | 11/2013 | Ledlie et al. | |
| 2002/0091793 A1 | 7/2002 | Sagie | |
| 2004/0268232 A1 | 12/2004 | Tunning | |
| 2005/0048987 A1* | 3/2005 | Glass | 455/456.1 |
| 2005/0099288 A1* | 5/2005 | Spitz et al. | 340/506 |
| 2005/0248560 A1* | 11/2005 | Agrawala | G06T 19/00 345/418 |
| 2006/0020898 A1* | 1/2006 | Kim et al. | 715/764 |
| 2008/0177510 A1* | 7/2008 | Jin et al. | 703/1 |
| 2008/0270886 A1* | 10/2008 | Gossweiler et al. | 715/227 |
| 2009/0109216 A1* | 4/2009 | Uetabira | 345/419 |
| 2010/0115455 A1 | 5/2010 | Kim | |
| 2011/0316884 A1* | 12/2011 | Giambalvo et al. | 345/660 |
| 2012/0159402 A1* | 6/2012 | Nurmi et al. | 715/863 |
| 2012/0297346 A1* | 11/2012 | Hoffknecht et al. | 715/850 |
| 2013/0145293 A1 | 6/2013 | Yoakum et al. | |
| 2013/0174087 A1* | 7/2013 | Chen et al. | 715/800 |
| 2013/0321269 A1* | 12/2013 | Beaurepaire | 345/158 |
| 2014/0098085 A1* | 4/2014 | Lee | G06F 3/0487 345/419 |
| 2014/0195961 A1* | 7/2014 | Shoemaker et al. | 715/776 |

OTHER PUBLICATIONS

"Floor Plan Navigation," YouTube video (Aug. 18, 2009). Retrieved from the Internet on Jul. 10, 2012: URL:http://www.youtube.com/watch?v=v1kcdOQrgvc.

"GAB RTLS Indoor Navigation The "Killer" App Everybody Waited For," YouTube video (Oct. 6, 2011). Retreived from the Internet on Jul. 10, 2012: URL:http://www.youtube.com/watch?v=RekZ200xe20.

"Google Maps 6.0 for Android Smartphones Updated with Indoor Maps," YouTube video (Nov. 29, 2011). Retrieved from the Internet on Jul. 10, 2012: URL:http://www.youtube.com/watch?v=ubU5RFovOgo.

"Moi Indoor Navigation Touch Screens," Bëhance (Nov. 25, 2011). Retreived from the Internet on Jul. 10, 2012: URL:http://www.behance.net/gallery/Moi-indoor-Navigation-Touch-Screens/2466609.

"Nokia Maps Indoor Spaces," Patexia video (May 1, 2012.). Retreived from the Internet on Jul. 10, 2012: URL:http://www.patexia.com/feed/nokia-maps-indoor-spaces-4093.

Isaac, "New Version of Google Maps Brings Indoor Floor Plans to Your Phone," Gabget Lab; Wired (Nov. 29, 2011). Retrieved from the Internet on Jul. 10, 2012: URL:http://www.wired.com/gadgetlab/2011/11/google-maps-indoor-update/.

Kumparak, "Tiny Tower Developers Call Out Zynga for Copying Their Game (After They Refused to be Acquired)," TechCrunch (Jan. 24, 2012). Retrieved from the Internet on Jul. 10, 2012: URL:http://techcrunch.com/2012/01/24/tiny-tower-developers-call-out-zynga-for-their-look-alike-game/.

Olwal et al., "Rubbing and Tapping for Precise and Rapid Selection on Touch-Screen Displays," *Proceedings of CHI 2008* (*SIGCHI Conference on Human Factors in Computing Systems*), pp. 295-304 (Apr. 5-10, 2008).

\* cited by examiner

VERTICAL FLOOR EXPANSION ON AN INTERACTIVE DIGITAL MAP

FIELD OF THE DISCLOSURE

The present disclosure relates to interactive digital maps and, more particularly, to providing an interface for interacting with representations of multi-story buildings displayed as part of digital maps on a computing device.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, a wide variety of computing devices, including many portable devices, support software applications that display interactive digital maps ("mapping applications"). For example, mapping applications may run on laptop and tablet computers, mobile phones, car navigation systems, hand-held global positioning system (GPS) units, etc. Many of these devices are equipped with a touchscreen, a touchpad, or are otherwise configured to receive input that includes finger gestures. A user may, for example, may pan across a map by swiping her finger in the desired direction, zoom in on an area by pinching two fingers together, etc.

In general, a mapping application can display various types of geographic data including topographical data, street data, urban transit information, and traffic data. Further, the geographic data may be schematic or based on photography, such as satellite imagery. Still further, a mapping application can display the information in a two-dimensional (2D) or three-dimensional (3D) format.

A user sometimes may operate a mapping application to view a map of an urban area rendered two-dimensionally and schematically to better see street names, names of landmarks, etc. However, such maps may include multi-story buildings for which additional floor-specific information is available. For example, different information may be available for each of ten floors of a building, and it is difficult for a mapping application to display this information two-dimensionally without creating confusion and clutter. On the other hand, displaying information for a multi-story building as part of a 3D map can result in some of the information being obscured.

SUMMARY

One embodiment of the techniques discussed below is a method for providing an interactive display of multi-story buildings displayed on a map. The method is implemented in a computing device having a user interface that is configured to receive gesture-based input. The method includes displaying a digital map of a geographic area via the user interface and displaying, on the digital map, a three-dimensional (3D) representation of a multi-story building located in the geographic area, including displaying a plurality of stacked floor maps corresponding to a plurality of floors of the multi-story building. The method also includes detecting, via the user interface, a pinch gesture that is applied to the 3D representation of the multi-story building, and modifying a vertical distance between two of the plurality of stacked floor maps in accordance with the pinch gesture, including not modifying a zoom level at which the two of the plurality of stacked floor maps are displayed.

Another embodiment of the techniques described in the present disclosure is a method in a computing device for providing a digital map of outdoor and indoor locations via a user interface. The method includes displaying a three-dimensional (3D) representation of a multi-story building located in a geographic area of the digital map while displaying a plurality of stacked floor maps corresponding to a plurality of floors of the multi-story building. The method also includes detecting a pinch gesture, via the user interface, that is applied to the 3D representation of the multi-story building. In detecting the pinch gesture, a first point of contact is detected that overlays a first one of the plurality of stacked floor maps corresponding to a first one of the plurality of floors and a second point of contact is detected that overlays a second one of the plurality of stacked floor maps corresponding to a second one of the plurality of floors, where at least one of the plurality of floors is not between the first one of the plurality of floors and the second one of the plurality of floors. Finally, the method includes modifying vertical distances between pairs of floor maps in a range between the first one of the plurality of stacked floor maps and the second one of the plurality of stacked floor maps while not modifying vertical distances between one or more pairs of floor maps outside the range.

Still another embodiment of the techniques discussed below is a computer-readable storage medium, having stored thereon a set of instructions, for providing an interactive display of multi-story buildings displayed on a map. The instructions stored in the computer-readable storage medium may be executed on a processor in a computing device having a user interface that is configured to receive gesture-based input. The computer-readable storage medium includes instructions for displaying a digital map of a geographic area via the user interface and displaying, on the digital map, a three-dimensional (3D) representation of a multi-story building located in the geographic area, including displaying a plurality of stacked, individually selectable floor maps corresponding to a plurality of floors of the multi-story building. The computer-readable storage medium also includes instructions for detecting, via the user interface, a gesture that operates directly on the 3D representation of the multi-story building, and instructions for modifying a vertical distance between two of the plurality of stacked floor maps in accordance with gesture and in response to detecting the gesture, including not modifying a zoom level at which the two of the plurality of stacked floor maps are displayed.

DETAILED DESCRIPTION

Figure 1:
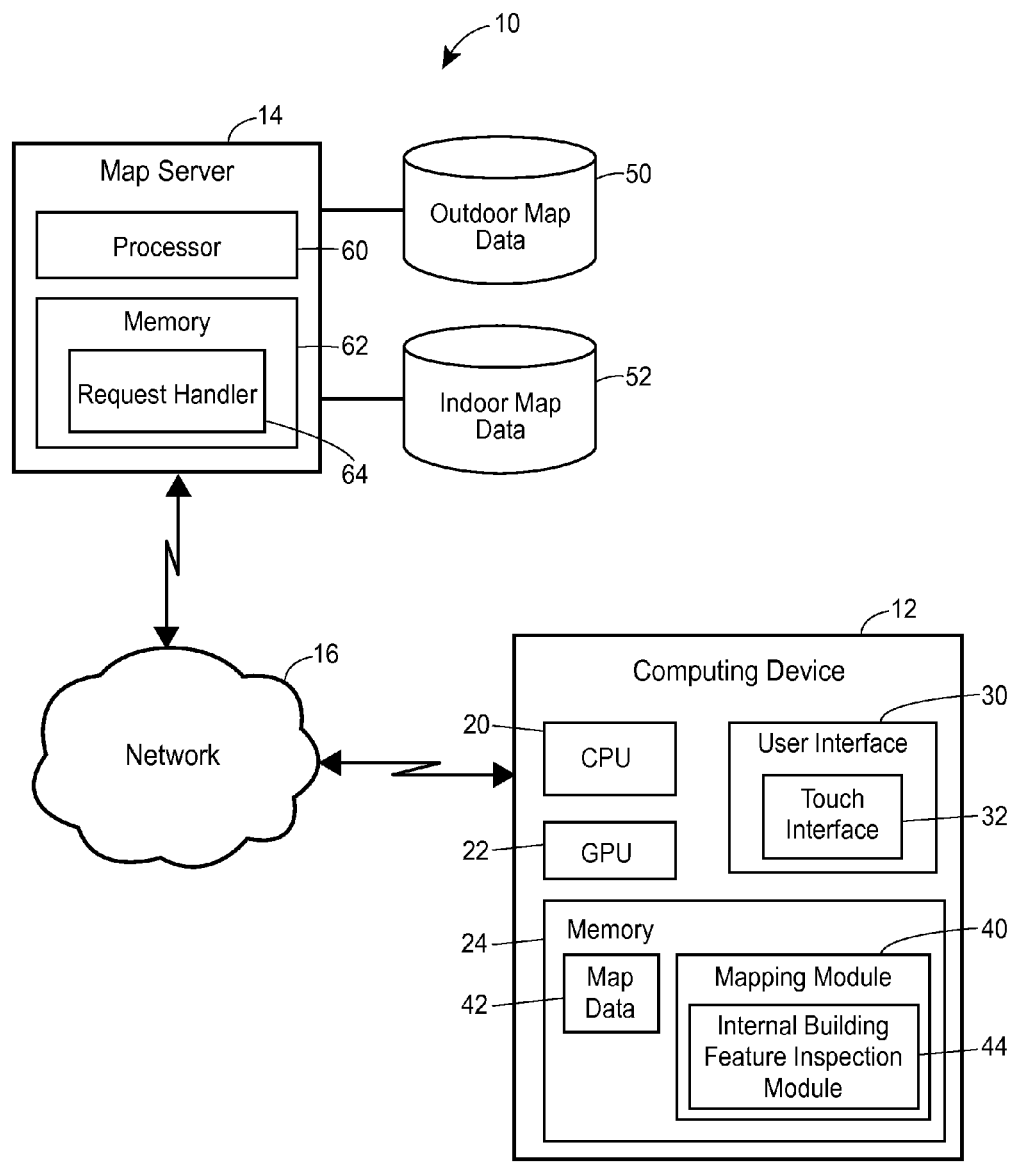
FIG. 1 is a block diagram of an example system in which techniques for presenting internal features of a multi-floor building in a mapping application are implemented.

A mapping software module operating on a computing device displays an interactive digital map of a geographic region in which a multi-story building is located. The mapping software module provides an intuitive, space-efficient, and aesthetically pleasing user interface for inspecting the internal features of the multi-story building, such as floor maps that include floor contours as well as internal wall layout and names of individuals or organizations occupying different floors of the building.

In one example implementation, the mapping software module displays a 2D schematic map that includes low-detail 3D outlines of buildings, which may be displayed to scale with the map. A user selects the desired building by tapping on the corresponding 3D outline. The mapping software module then expands the low-level outline view of the selected multi-story building to display the internal features of the building as a 3D stack of floor maps or contours, each illustrated in a perspective view. The 3D stack in some cases is significantly larger than the low-detail 3D outline, so that the floor contours are clearly visible and easily viewable. The mapping software module allows the user to modify a vertical distance between every floor map of the building via a gesture that operates directly on the expanded representation of the multi-story building. In expanding the vertical distance between each floor map, for example, the mapping software module allows the user to view more internal features of each floor map because of the increased spacing between floor maps. For example, when the space above one particular floor of a multi-story office building is expanded to allow better visibility, the mapping module may display internal features of the floor map for the particular floor, such as businesses, stores, restrooms, escalators, etc. located on that particular floor. Once the user taps outside this expanded representation of the multi-story building, the mapping software module "collapses" the view of the multi-story building back to a 3D outline.

According to one example implementation on a computing device equipped with a touchpad or a touchscreen, the mapping software module allows the user to expand a vertical distance or spacing between each floor map of a representation of a 3D building using a pinch gesture. More specifically, after selecting a particular representation of a building, the user performs a pinch gesture to expand the vertical distance between each floor map in accordance with the pinch gesture. In detecting the rate of the pinch gesture, the mapping application may expand the vertical distance between every floor map at a rate identical to the detected pinch gesture rate. Likewise, the mapping application may expand the vertical distance between every floor map to the same extent as is relatively proportional to the detected pinch gesture. Moreover, the user may apply a pinch gesture to only a subset of floors within the representation, and in response, the mapping application may expand the vertical distance between the floor maps for only the floors in the subset. Thus, the user may desire to only expand the upper floors of a ten-story office building to view features of an internal floor map for those selected particular upper floors.

These techniques are discussed in more detail below with reference to FIGS. 1-7. In particular, an example system in which a mapping software module may interactively present internal features of buildings is described with reference to FIG. 1, example screenshots of the mapping software module are discussed with reference to FIGS. 2-5, and example methods which the mapping software module may implement to provide a user interface for inspecting internal features of multi-story buildings are discussed with reference to FIGS. 6 and 7.

Referring first to FIG. 1, a system 10 includes a computing device 12 coupled to a map server 14 via a communication network 16. The computing device 12 can be, for example, a laptop computer, a tablet computer, a smartphone, etc. In the embodiment illustrated in FIG. 1, the computing device 12 includes a central processing unit (CPU) 20, a graphics processing unit (GPU) 22, a computer-readable memory 24, and a user interface 30 including a touch interface 32. In various implementations, the touch interface 32 can include a touchpad over which the user moves his fingers while looking at a separately provided screen, a touchscreen where the user places his fingers directly over the image being manipulated or over a displayed control being activated (e.g. a displayed keyboard), etc. The memory 24 is a computer-readable non-transitory storage device that may include both persistent (e.g., a hard disk) and non-persistent (e.g., RAM) memory components, stores instructions executable on the CPU 20 and/or the GPU 22 that make up a mapping software module 40 and map data 42 on which the mapping module 40 operates. The mapping software module 40 includes an internal building feature inspection module 44 that allows users to easily inspect internal features of multi-story buildings.

The mapping software module 40 according to various implementations operates as a separately executable software application, a plugin that extends the functionality of another software application such as a web browser, an application programming interface (API) invokable by a software application, etc. The instructions that make up the mapping software module 40 may be compiled and executable on the CPU 20 and/or the GPU 22 directly, or not compiled and interpreted by the CPU 20 at runtime. Further, the internal building feature inspection module 44 may be provided as an integral part of the mapping software module 40 or as a separately installable and downloadable component.

Depending on the implementation, the map data 42 may be in a raster format, such as Portable Network Graphics (PNG), a vector graphics format (based on mathematical descriptions of geometric shapes), or any other suitable format. The map data 42 in some cases is divided into map tiles, or portions of a map image having a certain fixed size, such as 256 by 256 pixels. In operation, the mapping module 40 receives the map data 42 from the map server 14, renders a map image based on the map data, and causes the map image to be displayed via the user interface 30. When the map data 42 is already rasterized, the mapping module 40 renders the map image by selecting and combining the proper rasterized tiles. However, if the map data 42 is in a vector graphics format, the mapping module 40 interprets the descriptions of various shapes to generate the corresponding raster images. The mapping module 40 also adjusts the displayed image and requests new map data, when necessary, in response to user input received via the user interface 30. More specifically, the user may change the zoom level, pan across the map, select a different map type (e.g., traffic map, terrain map), and otherwise interact with the map.

In an example scenario, the map server 14 receives a request that specifies the geographic area, the zoom level, and the map type. The map server 14 in response retrieves outdoor map data and indoor map data from an outdoor map database 50 and an indoor map database 52, respectively. The map server 14 then provides the outdoor map data, the indoor map data, and appropriate indications of how certain portions of the outdoor map data and the indoor map data are linked, to the computing device 12 as part of the map data 42.

When provided in a vector graphics format, outdoor map data may specify individual map elements representing such outdoor physical entities as roads, parks, bodies of water, external walls of buildings, and other natural and artificial objects visible outside, e.g., from above or at a street level. In a raster format, map elements typically are embedded into the same image. Outdoor map also may include text-based data for displaying various labels such as street names or names of landmarks. In general, outdoor map data may be for generating 2D images or 3D images, and may include schematic data, photographic images, or both.

Indoor map data may specify internal features of buildings such as the layout of internal walls or dividers, names of people, businesses, and organizations occupying different portions of a building, locations of elevators, escalators, restrooms, etc. For multi-story buildings, the indoor map data may specify internal features on a per-floor basis. Similar to outdoor map data, indoor map data may include both graphics content and non-graphics (e.g., text) content, and the graphics content may include schematic illustrations, photographic images, interactive and non-interactive icons, etc.

Certain portions of the outdoor map data may be logically linked to respective portions of indoor map data. In particular, certain map elements displayed on a map may be linked to indoor data that typically is not displayed on the map without an additional user request. In other words, certain map elements may be associated with additional map data that is not part of the map image typically displayed for the specified geographic region, map type, and zoom level. Referring to the map data 42, the map server 14 can provide outdoor map data as a collection of separate data structures, each containing a vector-based description of a map element, text-based label data, and metadata that further contains a unique identifier of another data structure storing the corresponding indoor map data. If the outdoor map data included in the map data 42 is rasterized, the unique identifier of a data structure storing indoor map data can be provided for a particular set of coordinates in the raster image. In either case, the mapping software module 40 can display the outdoor map data and provide interactive controls for activating the display of relevant indoor map data.

As a more specific example, according to one implementation, the map server 14 provides, as part of outdoor map data, external representations of buildings in the form of low-detail 3D outlines. The mapping software module 40 superimposes these 3D outlines over a 2D map. In another implementation, the map server 14 provides 3D mesh descriptions of buildings along with photographic imagery for texturing the corresponding 3D meshes. Using this type of map data, the mapping software module 40 can generate realistic, highly detailed external representations of buildings. In yet another implementation, the map server 14 provides merely 2D outlines, or "footprints" of buildings on a 2D map. A user can tap or click on these 2D or 3D external representations of buildings to instruct the mapping software module 40 to display the internal features of the buildings in an expanded format.

With continued reference to FIG. 1, the map server 14 may include a processor 60 and a memory 62 that stores a request handler 64, made up of instructions executable on the processor 60. The computing device 12 and the map server 14 may communicate in a client-server mode, where the computing device 12 sends requests for map data to the map server 14, and the map server 14 provides map data in response to these requests. More particularly, the request handler 64 in operation receives requests for map data from the computing device 12, identifies and retrieves the requisite map data from the outdoor map database 50 and/or the indoor map database 52, formats response messages that contain the map data, and causes the response messages to be transmitted to the computing device 12 via the network 16, which may be a wide area network (WAN) such as the Internet, a local area network (LAN), or any other suitable type of a network.

For simplicity, FIG. 1 illustrates the map server 14 as only one instance of a server device. However, the map server 14 according to some implementations includes in a group of one or more map server devices, each equipped with one or more processors and capable of operating independently of the other map server devices. Map server devices operating in such a group can process requests from the computing device 12 individually (e.g., based on availability), in a distributed manner where one operation associated with processing a request is performed on one map server device while another operation associated with processing the same request is performed on another map server device, or according to any other suitable technique. For the purposes of this discussion, the term "map server" may refer to an individual map server device or to a group of two or more map server devices.

Figure 2:
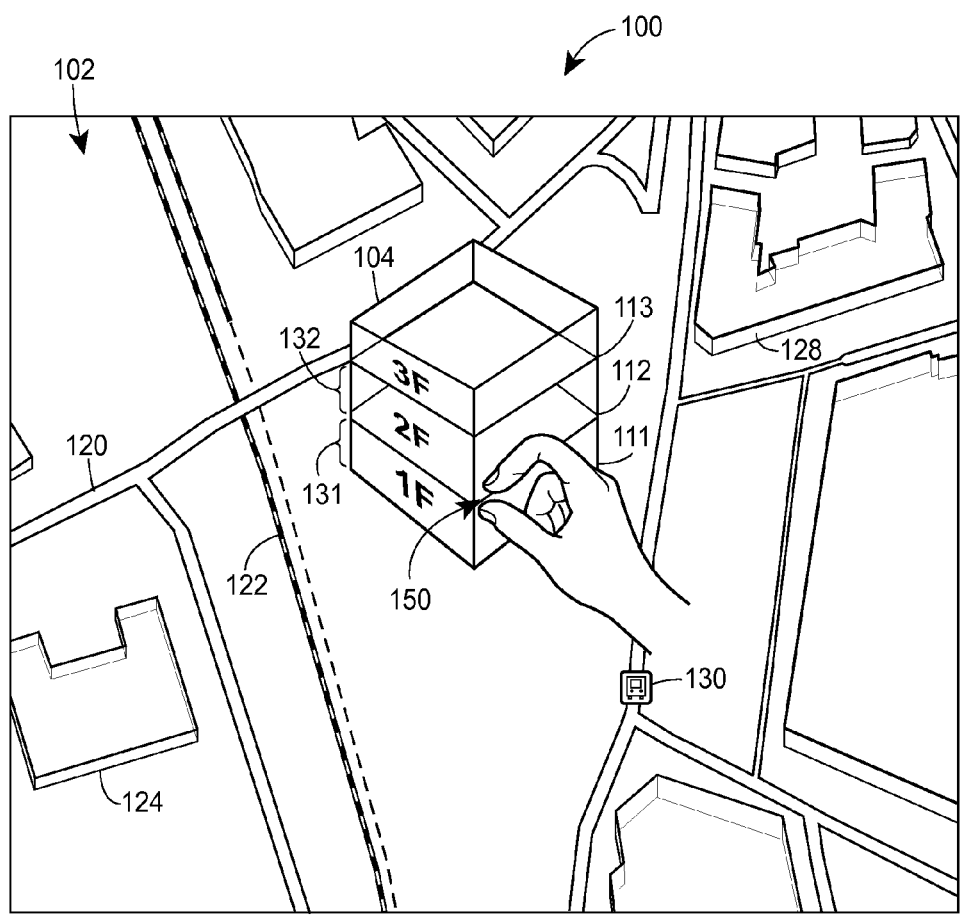
FIG. 2 is an example screenshot that illustrates the display of a multi-story building on a map as several stacked floor maps.
Figure 3:
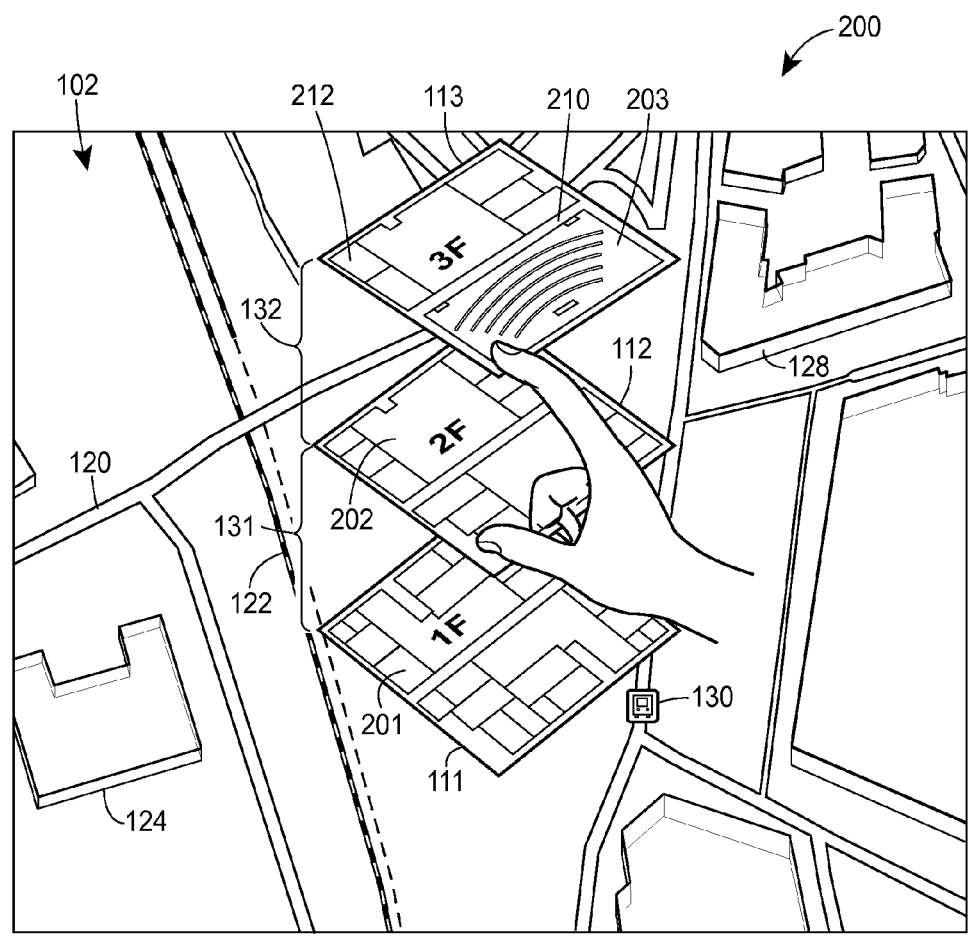
FIG. 3 is an example screenshot that illustrates the display of the vertical expansion of the floor maps of a multi-story building, with the internal features of each expanded floor map being displayed.

Now referring to FIGS. 2 and 3, an example screenshot 100 illustrates a representation 104 of a multi-story building overlaying a map of a geographic area 102. Indoor and outdoor map data are displayed within a same viewport in this example. The representation 104 includes several stacked floor maps 111-113. When a user selects the representation 104 and performs a pinch gesture on the selected the representation 104, the floor maps 111-113 vertically expand in accordance to the pinch gesture to reveal internal features of each expanded floor map of the multi-story building, as an example screenshot 200 illustrates in FIG. 3. For the purposes of this discussion, the term "pinch gesture" may refer to any type of pinch gesture including a pinching motion, spreading motion, rotating motion, or any other suitable motion that a user may gesture to indicate the vertical expansion or compression of floor maps of the multi-story building. Moreover, the pinch gesture may be replaced with a control element, such as widget with a "expand" button and a "compress" button or any other suitable manner in expanding or compressing the vertical distance between floor maps.

In this example, the map 102 illustrates several city blocks and includes various outdoor map elements such as roads 120, railroad tracks 122, and low-detail outlines of buildings 124 and 128. The map 102 also can include icons and text labels corresponding to outdoor map data, such as a map transit icon 130, for example. Although the map 102 is a 2D map on which most map elements are illustrated with a one-point projection, the expanded representation 104 in general can overlay any other suitable type of a map such as a 3D map, for example. A mapping software (e.g., the internal building feature inspection module 44 operating in the mapping software module 40 of FIG. 1 or a similar module) may provide functions for interacting with outdoor map data such as rotate, zoom, pan, etc., as well as functions for inspecting internal features of buildings when indoor map data is available. The screenshot 100 corresponds to the scenario in which the user selected the multi-story building by clicking or tapping on the corresponding low-detail outline, for example, and the mapping software in response generated the expanded representation 104.

The low-detail outline 124 or 128 provides a general indication of the shape of the building. The outline 124 or 128 typically does not provide a high-level of detail such the shape of every external wall or the ornamental features of the buildings, nor does the outline 124 illustrate internal features of the building. In the example of FIG. 2, the low-detail outlines 124 and 128 are 3D shapes displayed according to an isometric projection. In another implementation, however, these outlines can be illustrated with a two-point perspective. More generally, and as discussed above, buildings and other structures for which indoor map data is available generally can be illustrated using any suitable 2D or 3D shapes rendered with any desired level of detail.

According to some implementations, the mapping software provides an indication of whether indoor map data is available for an outdoor map element by changing the cursor, for example, or highlighting the map element upon detecting a hover event. In this manner, the user need not click or tap on a map element illustrating a building only to find out that internal map data for the building is unavailable.

As best seen in FIG. 2, the floor maps 111-113 are laid out on different planes tilted relative to the plane of the screen to provide a 3D view of the internal features of the corresponding building. The floor maps 111-113 partially overlap to more efficiently utilize screen real estate. Similar to low-detail 3D outlines, the stack of floor maps 111-113 is displayed according to an isometric projection, although it is possible to display the stack of floor maps 111-113 with a two-point perspective, for example. The mapping module may initially display the floors maps 111-113 as contours free of internal floor features. In embodiments according to which floors maps 111-113 display some or all internal floor features as partially or fully opaque, so that some of the floor maps can partially occlude other floor maps and thereby reduce clutter on the screen.

When the user begins vertically expanding the floors of the multi-story building using a pinch gesture, the distance between each floor maps 111-113 gradually increases to reveal more internal features of each lower floor map 111, 112 that is occluded by the floor map directly above 112, 113. Thus, for example, if the user makes a pinch gesture, such as a spreading motion, in the vicinity of a point 150, the distance 131 between floor one 111 and floor two 112 and the distance 132 between floor two 112 and floor three 113 begin vertically increasing at a rate relative to the pinch gesture. In this example and as illustrated in FIG. 3, both distances 131, 132 between floors continue vertically expanding according to the pinch gesture until the user ceases performing the pinch gesture. In response to the user terminating the pinch gesture, each expanded floor map 111-113 may remain at its expanded position or may collapse back down to its original non-expanded position immediately or after a predetermined time interval. In an alternative example, the distances 131, 132 between floors may switch from vertical expansion to vertical compression upon the user changing the type of pinch gesture, such as a pinching motion.

With reference to FIG. 3, the detailed floor maps 201-203 are generated using indoor map data and may illustrate, in addition to the contours of the floor, hallways 210 and rooms or offices 212, although in general each detailed floor map 201-203 can depict any available indoor floor features. In the example of FIG. 3, the detailed floor map 203 is fully visible so that no part of the detailed floor map 202 is occluded by any of the floor maps of lower or higher floors. When the user further expands the floor maps 111-113 using the pinch gesture, both the floor maps 111, 112 of the first floor and second floor become fully visible. Alternatively, the mapping module may only display the internal features of a detailed floor map 202-203 when the distance 131, 132 between two floors of the multi-story building is greater than a threshold. For example, the detailed floor map 202 is only visible when the distance between floor map 112 of floor two and the floor map 113 of floor three is greater than a certain threshold value. The threshold value may be preset for all floors, configured for specific floors, configured for to specific buildings or types of buildings, dynamically determined based on the zoom level, etc. The mapping application may alternatively reveal the detailed floor maps 201-203 to the user as each expanding floor map 111-113 becomes visible during the pinch gesture, or determine when to display the detailed floor maps 201-203 in any suitable manner.

Figure 4:
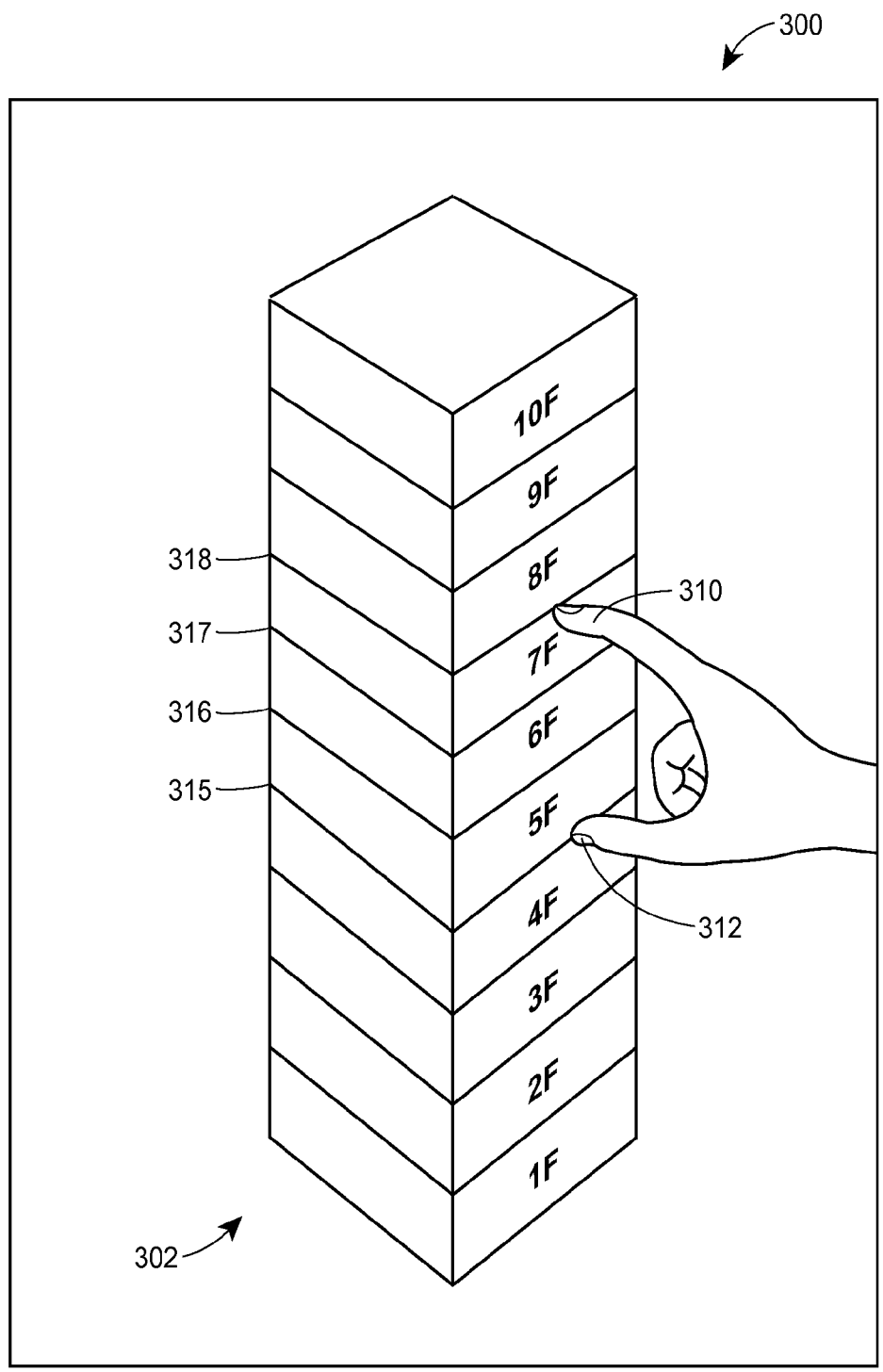
FIG. 4 is an example screenshot that illustrates the display of a tall multi-story building on a map as many stacked floor maps.
Figure 5:
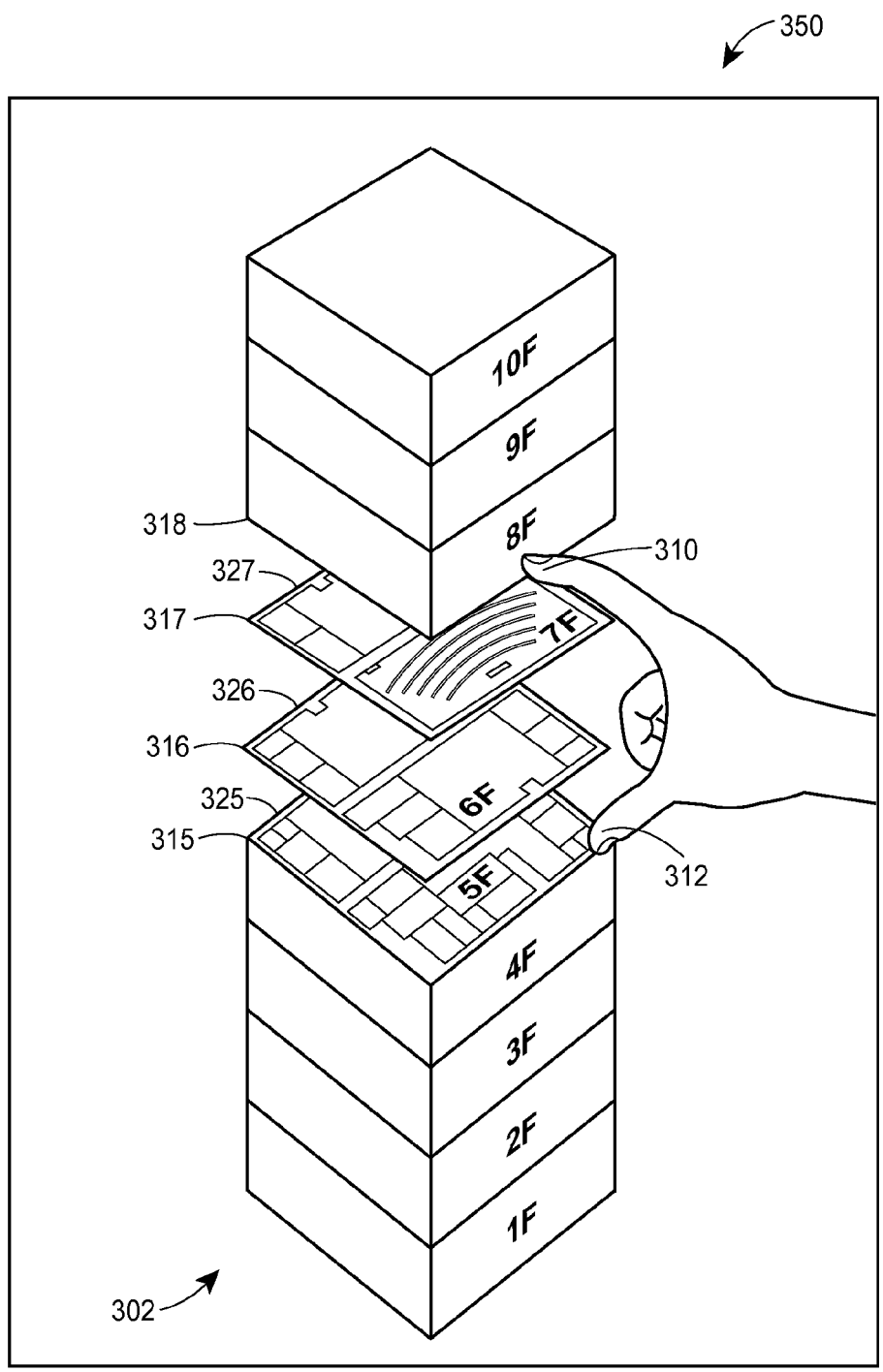
FIG. 5 is an example screenshot that illustrates the display of the vertical expansion of some of the floor maps of a tall multi-story building, with the internal features of each expanded floor map being displayed differently than unexpanded floors.

Now referring to FIGS. 4 and 5, an example screenshots 300 illustrates a representation of a ten-story mid-rise building 302 displayed on a map. When the user initiates a pinch gesture at a pinch gesture point (i.e., point of contact) 310 near floor eight 302 of the representation of the building 302 and a pinch gesture point 312 near floor five of the representation of the building, only the floor maps between the two points 310, 312 may expand while other floor maps outside the two points 310, 312 remain stationary, as illustrated in an example screenshot 350. As shown in FIG. 5, only the distances between the floor maps 315-318 that are positioned between the two pinch gesture points 310, 312 vertical expand relative to the pinch gesture to reveal the features of the detailed floor maps 325-327. This allows for better use of screen real estate while allowing the user to quickly view the features of an internal map for a particular floor in a large building, such as a sixty-story office building.

Referring back to FIGS. 2 and 3, the user may tap on a point on the map 102 that is outside the expanded representation 104 or move the viewport so that the expanded representation 104 is no longer visible. In response, the mapping software may revert to the mode in which the user interacts with outdoor map data. In particular, the expanded representation 104 may collapse to the low-detail representation 204.

Thus, according to some implementations, the internal building feature inspection module 44 provides an interface for inspecting indoor map data free of additional controls (such as buttons for expanding the distance between floors or a floor picker with numbered buttons displayed over the map). In other implementations, however, the internal building feature inspection module 44 additionally or alternatively provides controls overlaying the map. For example, the internal building feature inspection module 44 may display a floor picker next to a multi-story building and support a pinch gesture for changing the distance between floors.

To further illustrate the techniques for providing an intuitive and efficient interface for inspecting indoor and outdoor map data, example methods that the internal building feature inspection module 44 may implement are discussed next with reference to FIGS. 6 and 7. More generally, these methods can be implemented in any suitable computing device and any suitable software application. For example, these methods can be implemented as sets of instructions stored on a computer-readable medium and executable on a processor.

Figure 6:
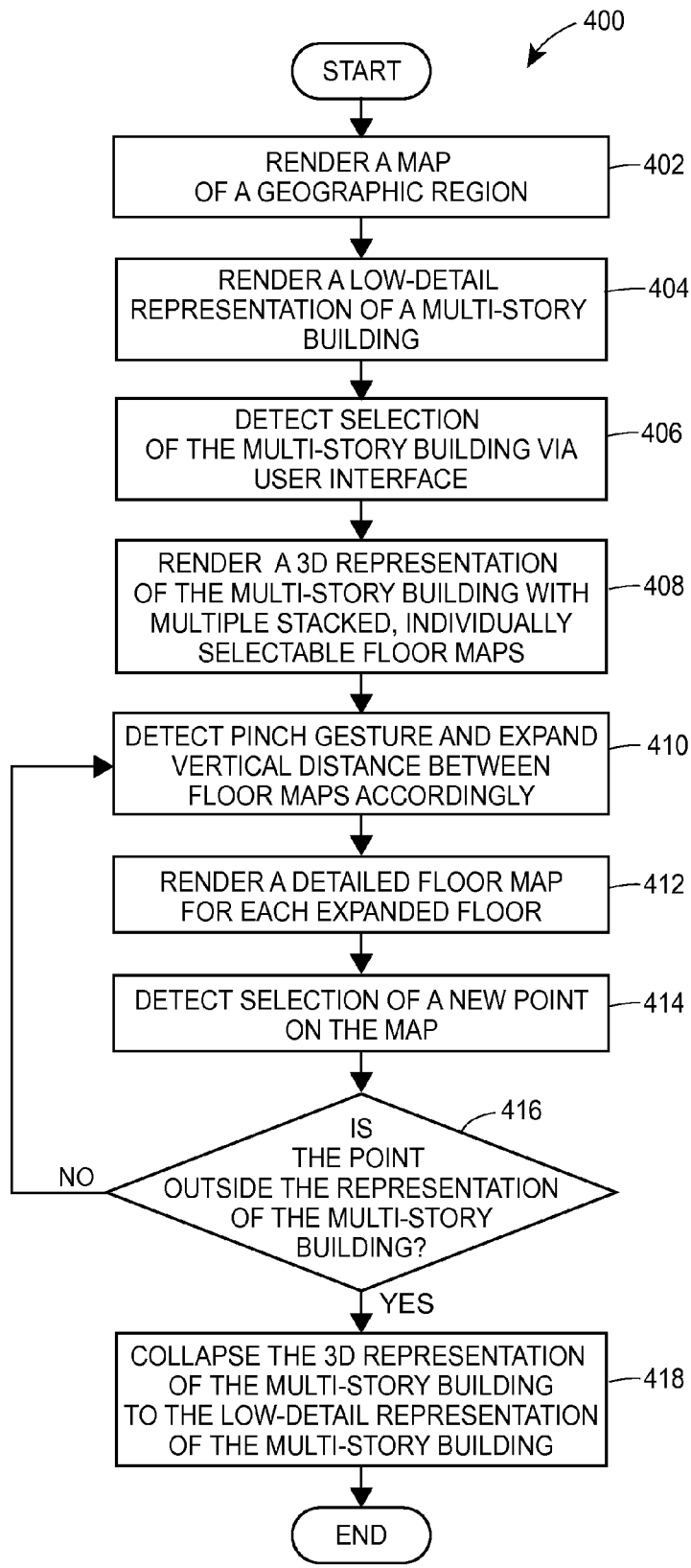
FIG. 6 is a flow diagram of an example method for displaying a representation of a multi-story building on a map of a geographic region.

The flow diagram of FIG. 6 illustrates an example method 400 for displaying a representation of a multi-story building on a map of a geographic region. At block 402, an interactive digital map of a geographic region is rendered. The rendered digital map may be rendered using outdoor map data and may display map elements such as roads, buildings, parks, bodies of water, etc. A low-detail representation of a multi-story building is rendered at block 404. As discussed above, a low-detail representation is only one example of a suitable external representation of the building. In other embodiments, the external representation may be a detailed 3D representation textured with photographs of the building.

Next, at block 406, a selection of the multi-story map on the digital map is detected. The selection may correspond to a tap event, for example, if a touch interface is used. An extended 3D representation of the multi-story building having multiple stacked floor maps is rendered at block 408. Referring back to FIG. 2, this representation may be similar to the representation 104.

At block 410, a pinch gesture, as applied to the representation, is detected via the user interface, and a vertical distance between each floor map and its neighboring floor map is expanded in accordance with the pinch gesture. While the representation of the building is selected at the block 406, the zoom level of the displayed representation of the building does not change during the detection of the pinch and the expansion of the vertical distance between floor maps. For example, the user performs a pinch gesture anywhere near the representation and, in response, the vertical distance between each floor map and its neighboring floor map expands while the user continues to perform the pinch gesture. Generally, the user performs the pinch gesture until each floor map in the representation may be viewed in sufficient detail.

A detailed floor map for each expanded floor map is rendered at block 412. The detailed floor map may display geometric shapes, icons, photography, text, etc. to illustrate various internal floor features. The detailed floor map may be rendered at any time, such as when the vertical distance between one floor map and its neighboring floor map is greater than a threshold, for example. When a selection of a new point on the digital map is detected (block 414), it is determined whether the new point is outside the expanded representation of the multi-story building (block 416). If the new point is inside the expanded representation, the flow returns to block 410, where a new or the same floor is selected. Otherwise, the flow proceeds to block 418 to await the detection of another pinch gesture.

At block 418, the extended 3D representation of the multi-story building is collapsed back to the low-detail representation of the same building. In this manner, the user can effectively switch between the outdoor map data inspection mode and the indoor map data inspection mode.

Figure 7:
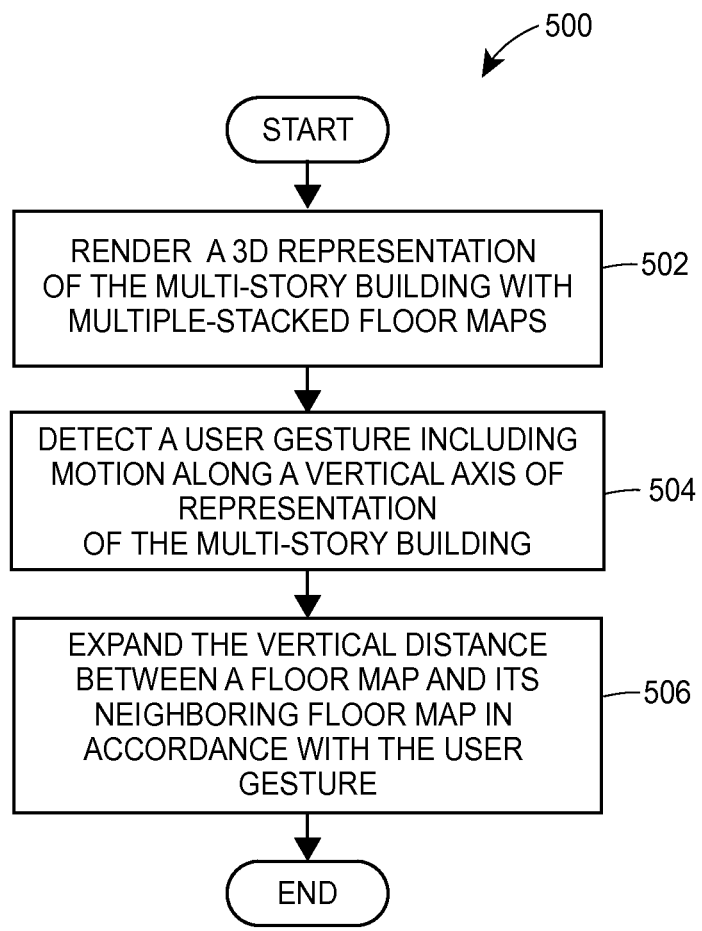
FIG. 7 is a flow diagram of an example method for displaying internal features of a multi-story building in response to gesture-based user input.

FIG. 7 is a flow diagram of an example method 500 for displaying internal features of a multi-story building in response to gesture-based user input. More particularly, a software module may implement the method 500 to allow a user to browse through floor maps of a multi-story building. The method 500 can be invoked, for example, at blocks 408-410 of the method 400 discussed above.

At block 502, a 3D representation of a multi-story building is rendered similarly to the block 408 discussed with reference to FIG. 4. Next, at block 504, a user gesture is detected. The gesture, such as the pinch gesture, includes the pinching motion or spreading motion, for example, of a finger along a vertical axis of the 3D representation of the building. In another implementation, however, the motion may include a motion along a different axis, such as the horizontal axis.

According to the method 500, each vertical distance between each floor map and its neighboring floor map is expanded at block 506. More particularly, each vertical distance between each floor map and its neighboring floor map is expanded in accordance to the detected pinch gesture. Alternatively, each vertical distance between each floor map and its neighboring floor map may also be compressed in accordance with the detected pinch gesture. The internal features of the activated floor are displayed, in general, when the vertical distance between two floor maps in greater than a certain threshold value.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components or modules. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In some cases, a hardware module may include dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. It will be appreciated that the decision to implement a hardware module in dedicated and permanently configured circuitry or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a SaaS. For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for providing an interface for inspecting indoor and outdoor map data through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for providing an interactive display of multi-story buildings displayed on a digital map, the method comprising:
   displaying a digital map of a geographic area via a touchscreen;
   displaying, on the digital map, an exploded-view of a three-dimensional (3D) stack of a plurality of floor maps corresponding to a plurality of floors of a multi-story building located in the geographic area,
      (i) the exploded view of the 3D stack including two floor maps for two adjacent floors, the two floor maps including a first floor map and a second floor map separated by a vertical space, the first floor map corresponding to a first floor from the plurality of floors and the second floor map corresponding to a second floor from the plurality of floors, wherein the second floor is positioned directly above the first floor in the multi-story building, and
      (ii) each of the plurality of floor maps laid out on a plane different than the plane of the touchscreen;
   detecting, via the touchscreen, a pinch gesture, wherein the pinch gesture is applied to the exploded-view of the 3D stack, wherein the detected pinch gesture is a motion in a direction along a vertical axis of the 3D stack; and
   revealing internal features for the first floor map that are occluded by the second floor map by adjusting the exploded-view of the 3D stack of the plurality of floor maps by increasing the vertical space between the first floor map and the second floor map in accordance with the pinch gesture, including not modifying a zoom level at which the two of the plurality of floor maps are displayed;
   wherein revealing the internal features for the first floor map that are occluded by the second floor map includes: revealing the internal features for the first floor map when the vertical space between the first floor map and the second floor map is greater than a threshold value.

2. The method of claim 1, wherein revealing the internal features for the first floor map includes displaying one or more of:
   (i) an internal wall layout,
   (ii) names of businesses or individuals occupying portions of a floor corresponding to the first one of the plurality of floor maps, and
   (iii) indications of building facilities for each floor.

3. The method of claim 1, wherein:
   detecting the pinch gesture includes detecting a speed associated with a motion of one point of contact relative to another point of contact, and
   the vertical space is increased at a rate proportional to the detected speed.

4. The method of claim 1, further comprising modifying a distance of vertical space between each pair of neighboring floor maps in the plurality of floor maps.

5. The method of claim 4, wherein the distance of vertical space between any two neighboring floor maps is modified by a same amount.

6. The method of claim 1, wherein adjusting the exploded-view of the 3D stack further includes modifying a distance of vertical space between any two neighboring floor maps that are positioned between two points of contact of the pinch gesture.

7. The method of claim 1, wherein displaying the exploded-view of the 3D stack is in response to receiving a selection of the multi-story building via the user interface; the method further comprising displaying a low-detail representation of the multi-story building when the multi-story building is not selected, the low-detail representation of the multi-story building not displaying individual floor maps.

8. The method of claim 7, wherein displaying the low-detail representation of the multi-story building includes displaying a 3D outline view of external facets of the multi-story building.

9. The method of claim 1, wherein detecting the pinch gesture is subsequent to receiving a selection of a 3D representation of the multi-story building via a tap gesture.

10. A method in a computing device for providing a digital map, the method comprising:
   displaying an exploded-view of a three-dimensional (3D) stack of a plurality of floor maps corresponding to a plurality of floors of a multi-story building located in a geographic area,
      (i) the exploded view of the 3D stack including two floor maps for two adjacent floors, the two floor maps including a first floor map and a second floor map separated by a vertical space, the first floor map corresponding to a first one of the plurality of floors and the second floor map corresponding to a second one of the plurality of floors, wherein the second floor is positioned directly above the first floor in the multi-story building, and
      (ii) each of the plurality of floor maps laid out on a plane different than the plane of the touchscreen;
   detecting, via a touchscreen, a pinch gesture, wherein the pinch gesture is applied to the exploded-view of the 3D stack and wherein the detected pinch gesture is a motion in a direction along a vertical axis of the 3D stack, including:
      (i) detecting a first point of contact overlaying a third floor map corresponding to a third one of the plurality of floors, and
      (ii) detecting a second point of contact overlaying a fourth floor map corresponding to a fourth one of the plurality of floors, wherein at least one of the plurality of floors is not between the third one of the plurality of floors and the fourth one of the plurality of floors;
   revealing internal features of the first floor map that are occluded by the second floor map by adjusting the exploded-view of the 3D stack of the plurality of floor maps by increasing the vertical space between the first floor map and the second floor map, wherein the first floor map and the second floor map are within a range between the third floor map and the fourth floor map, including not modifying vertical distances between one or more pairs of floor maps outside the range;

wherein revealing the internal features of the first floor map that are occluded by the second floor map includes: revealing the internal features for the first floor map when the vertical space between the first floor map and the second floor map is greater than a threshold value.

11. The method of claim 10, wherein detecting the pinch gesture includes detecting a speed associated with a motion of the pinch gesture, and wherein the vertical space is increased at a rate proportional to the detected speed.

12. The method of claim 11, further including increasing a second vertical space between two other floor maps within the range;

wherein the vertical space and the second vertical space are increased identically.

13. The method of claim 10, wherein displaying the exploded-view of the 3D stack includes displaying the plurality of floor maps on a plurality of respective planes arranged in the 3D stack and displayed in a perspective view.

14. The method of claim 10, wherein displaying the exploded-view of the 3D stack of the plurality of floor maps includes:

displaying a respective contour for each of the plurality of floor maps without displaying internal features of the corresponding floor for the floor maps outside the range.

15. The method of claim 10, wherein the digital map includes roads.

16. The method of claim 10, further including displaying the digital map according to a one-point perspective.

17. The method of claim 10, further including detecting a gesture corresponding to one of a plurality of functions for changing the display of the digital map, the plurality of functions including at least one of pan, zoom, and rotate.

18. A non-transitory computer-readable storage medium having stored thereon a set of instructions, executable by a processor, for providing an interactive display of multi-story buildings displayed on a digital map, the instructions comprising:

instructions for displaying a digital map of a geographic area via a touchscreen;

instructions for displaying, on the digital map, an exploded-view of a three-dimensional (3D) stack of a plurality of floor maps corresponding to a plurality of floors of a multi-story building located in a geographic area,
  (i) the exploded view of the 3D stack including two floor maps for two adjacent floors, the two floor maps including a first floor map and a second floor map separated by a vertical space, the first floor map corresponding to a first one of the two adjacent floors and the second floor map corresponding to a second one of the two adjacent floors, the second floor positioned directly above the first floor in the multi-story building, and
  (ii) each of the plurality of floor maps laid out on a plane different than the plane of the touchscreen;

instructions for detecting, via the touchscreen, a pinch gesture, wherein the pinch gesture is applied to the exploded-view of the 3D stack and wherein the detected pinch gesture is a motion in a direction along a vertical axis of the 3D stack; and instructions for revealing internal features of the first floor map that are occluded by the second floor map by adjusting the exploded-view of the 3D stack of the plurality of floor maps by increasing the vertical space between the first floor map and the second floor map in accordance with the pinch gesture, including not modifying a zoom level at which the two floor maps are displayed;

wherein revealing the internal features of the first floor map that are occluded by the second floor map includes: revealing the internal features of the first floor map when the vertical space between the first floor map and the second floor map is greater than a threshold value.

19. The non-transitory computer-readable storage medium of claim 18, wherein the instructions for displaying the digital map includes instructions for displaying a plurality of map elements representing outdoor physical entities, the instructions further comprising:

instructions for providing a plurality of functions for changing the display of the plurality of map elements.

* * * * *